(12) United States Patent
Arimilli et al.

(10) Patent No.: US 8,302,109 B2
(45) Date of Patent: Oct. 30, 2012

(54) SYNCHRONIZATION OPTIMIZED QUEUING SYSTEM

(75) Inventors: Lakshminarayana Arimilli, Austin, TX (US); Claude Basso, Raleigh, NC (US); Piyush Chaudhary, Highland, NY (US); Bernard C. Drerup, Austin, TX (US); Jody B. Joyner, Austin, TX (US); Jan-Bernd Themann, Tuebingen (DE); Christoph Raisch, Gerlingen (DE); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 12/391,373

(22) Filed: Feb. 24, 2009

(65) Prior Publication Data

US 2010/0217905 A1    Aug. 26, 2010

(51) Int. Cl.
*G06F 3/03* (2006.01)
(52) U.S. Cl. ........................... 719/321; 719/327
(58) Field of Classification Search .................. None
See application file for complete search history.

(56) References Cited

U.S. PATENT DOCUMENTS

| | | | |
|---|---|---|---|
| 6,219,727 B1 * | 4/2001 | Kailash et al. | 710/48 |
| 6,622,193 B1 | 9/2003 | Avery | |
| 6,742,051 B1 * | 5/2004 | Bakshi et al. | 719/318 |
| 6,820,164 B2 | 11/2004 | Holm et al. | |
| 6,968,411 B2 | 11/2005 | Gaur et al. | |
| 6,983,337 B2 | 1/2006 | Diamant | |
| 7,043,582 B2 | 5/2006 | Singh et al. | |
| 7,735,099 B1 * | 6/2010 | Micalizzi, Jr. | 719/328 |
| 2002/0073131 A1 | 6/2002 | Brenner, Jr. et al. | |
| 2002/0116563 A1 | 8/2002 | Lever | |
| 2003/0065856 A1 | 4/2003 | Kagan et al. | |
| 2004/0111549 A1 | 6/2004 | Connor et al. | |
| 2006/0277400 A1 | 12/2006 | Veen et al. | |
| 2007/0168525 A1 | 7/2007 | DeLeon, III et al. | |
| 2007/0263629 A1 * | 11/2007 | Cornett et al. | 370/392 |
| 2008/0002578 A1 * | 1/2008 | Coffman et al. | 370/230 |
| 2009/0019196 A1 * | 1/2009 | Chew et al. | 710/54 |

OTHER PUBLICATIONS

Mattias O'Nils, Axel Jantsch, "Operating System Sensitive Device Driver Synthesis from Implementation Independent Protocol Specification," date,pp. 562, Design, Automation and Test in Europe (Date '99), 1999.
Mattias O'Nils, Axel Jantsch, "Device Driver and DMA Controller Synthesis from HW/SW Communication Protocol Specifications", Design Automation for Embedded Systems, 6, pp. 177-205, Kluwer Academic Publishers, Boston, 2001.

* cited by examiner

*Primary Examiner* — Emerson Puente
*Assistant Examiner* — Dong Kim
(74) *Attorney, Agent, or Firm* — Yudell Isidore Ng Russell PLLC (57) ABSTRACT

A synchronization optimized queuing method and device to minimize software/hardware interaction in network interface hardware during an end-of-initiative process, including network adapter queue implementations for network interface hardware for optimized communication in a computer system. An end-of-initiative procedure to ensure that the network interface hardware has received an interrupt enable and to recheck the interrupt queue is unnecessary in the present invention.

15 Claims, 6 Drawing Sheets

SYNCHRONIZATION OPTIMIZED QUEUING SYSTEM

U.S. GOVERNMENT RIGHTS

This invention was made with U.S. Government support under a Defense Advanced Research Projects Agency (DARPA) contract HR0011-07-9-0002. The U.S. Government has certain rights in this invention.

BACKGROUND OF THE INVENTION

1. Technical Field

The present invention relates in general to the field of computers, and in particular to hardware communication in a computer system. More particularly, the present invention relates to a synchronization optimized queuing system utilized with network interface hardware in a computer system.

2. Description of the Related Art

Computer systems typically utilize network interface hardware devices, such as one or more network adapters, to facilitate communication between the computer system and a wired or wireless internet, or intranet. Existing network adapter queue implementations for network interface hardware communication are not optimized for end of initiative handling of interrupts between the computer system and the network interface hardware. Existing networking adapter queue implementations for network interface hardware require a certain sequence of functions at the end of its processing routine, such as: a re-enable of interrupts to ensure that the network interface hardware has received an interrupt enable (e.g., by performing a memory-mapped input/output (MMIO) read instruction), and rechecking the queue to ensure that no data packets that are "in process" were missed during the enabling of interrupts, etc. This type of end of initiative sequence causes inefficiency in a processor which controls the computer system. Furthermore, MMIO read instructions cause the processor to wait, and to not execute any additional instructions until a present MMIO read instruction is processed.

At present, software device drivers which run within a computer system encounter processing completion notification inefficiencies. For example, there is significant central processing unit (CPU) overhead associated with processing each interrupt, as described above. Known attempts to optimize between frequent polling and interrupt generation in order to reduce latency, reduce the number of interrupts and to reduce polling an empty memory queue have not proved overly successful.

Thus, there is a need for an optimized queuing system for network interface hardware in a computer system that eliminates presently utilized end of initiative functions which ensure that the network interface hardware has received an interrupt enable and to recheck the interrupt queue.

SUMMARY OF THE INVENTION

Disclosed is synchronization optimized queuing method and device to minimize software/hardware interaction in network interface hardware, including network adapter queue implementations for network interface hardware, for optimized communication in a computer system. An end-of-initiative (completion) process to ensure that the network interface hardware has received an interrupt enable and to recheck the interrupt queue is eliminated in the present invention.

The above, as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Reference will now be made in detail to the embodiments of the present invention, examples of which are illustrated in the accompanying drawings, wherein like reference numerals refer to the like data entries throughout. The embodiments are described below in order to explain the present invention by referring to the figures. The specific reference numerals assigned to the data entries are provided solely to aid in the description and are not meant to imply any limitations (structural or functional) on the present invention.

The present invention provides a synchronization optimized queuing method and device to minimize software/hardware interaction in network interface hardware, including network adapter queue implementations for network interface hardware, for optimized communication in a computer system. An end-of-initiative (completion) process to ensure that the network interface hardware has received an interrupt enable and to recheck the interrupt queue is eliminated in the present invention.

Figure 1:
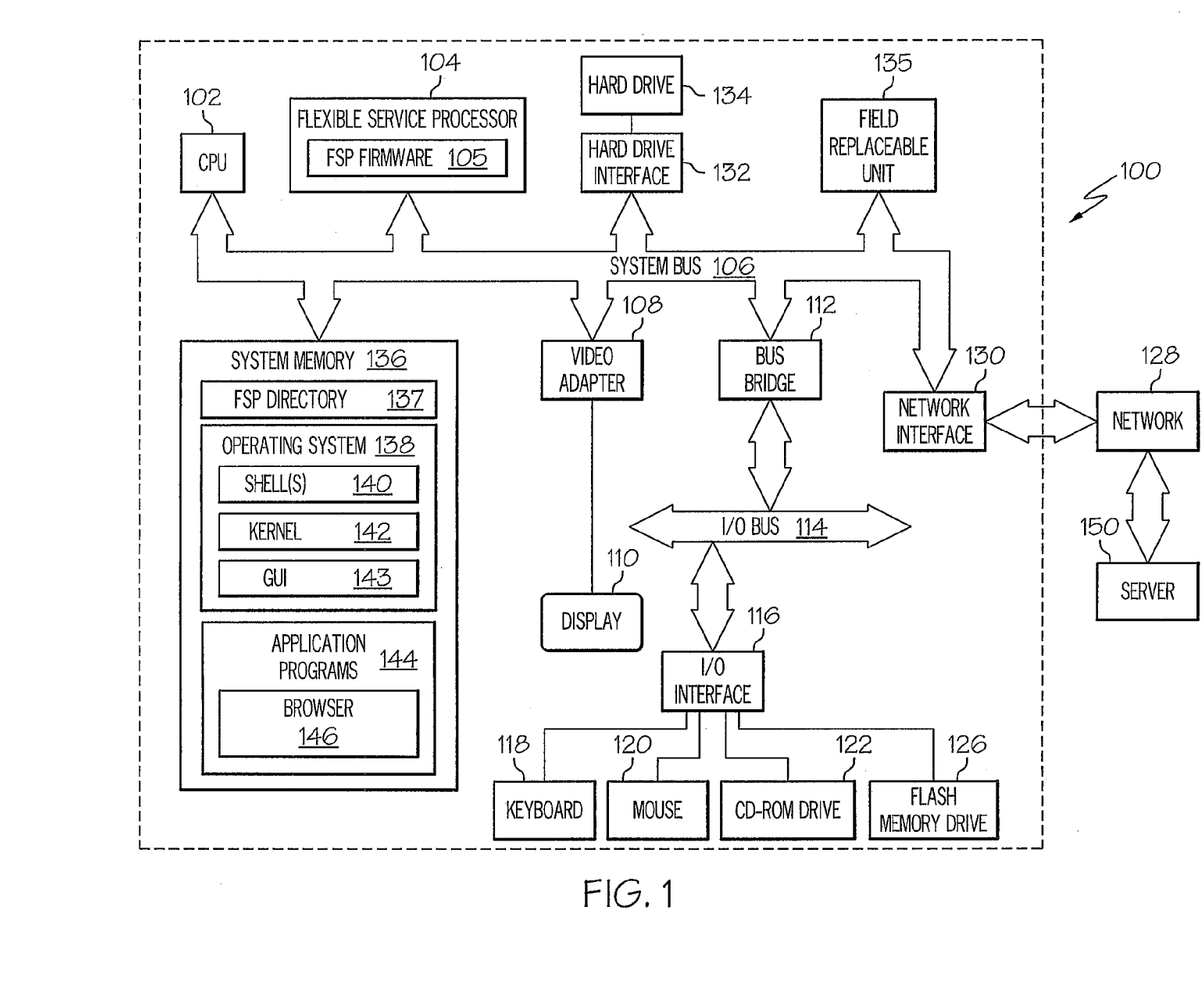
FIG. 1 depicts a high level block diagram of a computer, in accordance with an embodiment of the present invention.

Referring to FIG. 1, a high level block diagram is depicted of a computer 100, with which the present invention may be utilized. Computer 100 includes central processing unit (CPU) 102, which is coupled to system bus 106. Computer 100 also includes flexible service processor (FSP) 104, which is coupled to system bus 106. FSP 104 includes FSP firmware 105.

Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including, but not limited to, Universal Serial Bus (USB) ports.

Computer 100 is able to communicate with server 150 via network 128 using one or more network interface 130 which is coupled to system bus 106. Network interface 130 may be a network communication adapter (network adapter), such as an Ethernet controller where the network 128 is an Ethernet network. Network 128 may be an external network such as the Internet, or an internal network such as a Local Area Network (LAN), an Ethernet, or a Virtual Private Network (VPN). The server 150 may be configured similarly to computer 100.

Hard drive interface 132 is also coupled to system bus 106. Hard drive interface 132 interfaces with hard drive 134. Hard drive 134 may populate system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes FSP directory 137, Operating System (OS) 138, and application programs 144.

OS 138 includes shell 140, for providing transparent user access to resources such as application programs 144. Generally, shell 140 (as it is called in UNIX®) is a program that provides an interpreter function and an interface between a user and the operating system. Shell 140 provides a system prompt, interprets commands entered by a user on keyboard 118, mouse 120, or other user input media, and sends the interpreted command(s) to the appropriate lower levels of the operating system (e.g., kernel 142) for processing. As depicted, OS 138 also includes Graphical User Interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management. OS 138 may provide a GUI to be displayed on display 110.

Application programs 144 include browser 146. Browser 146 includes program modules and instructions enabling a World Wide Web (WWW) client (i.e., computer 100) to send and receive network messages to and from the Internet. Computer 100 may utilize HyperText Transfer Protocol (HTTP) messaging to enable communication with server 150.

Figure 2:
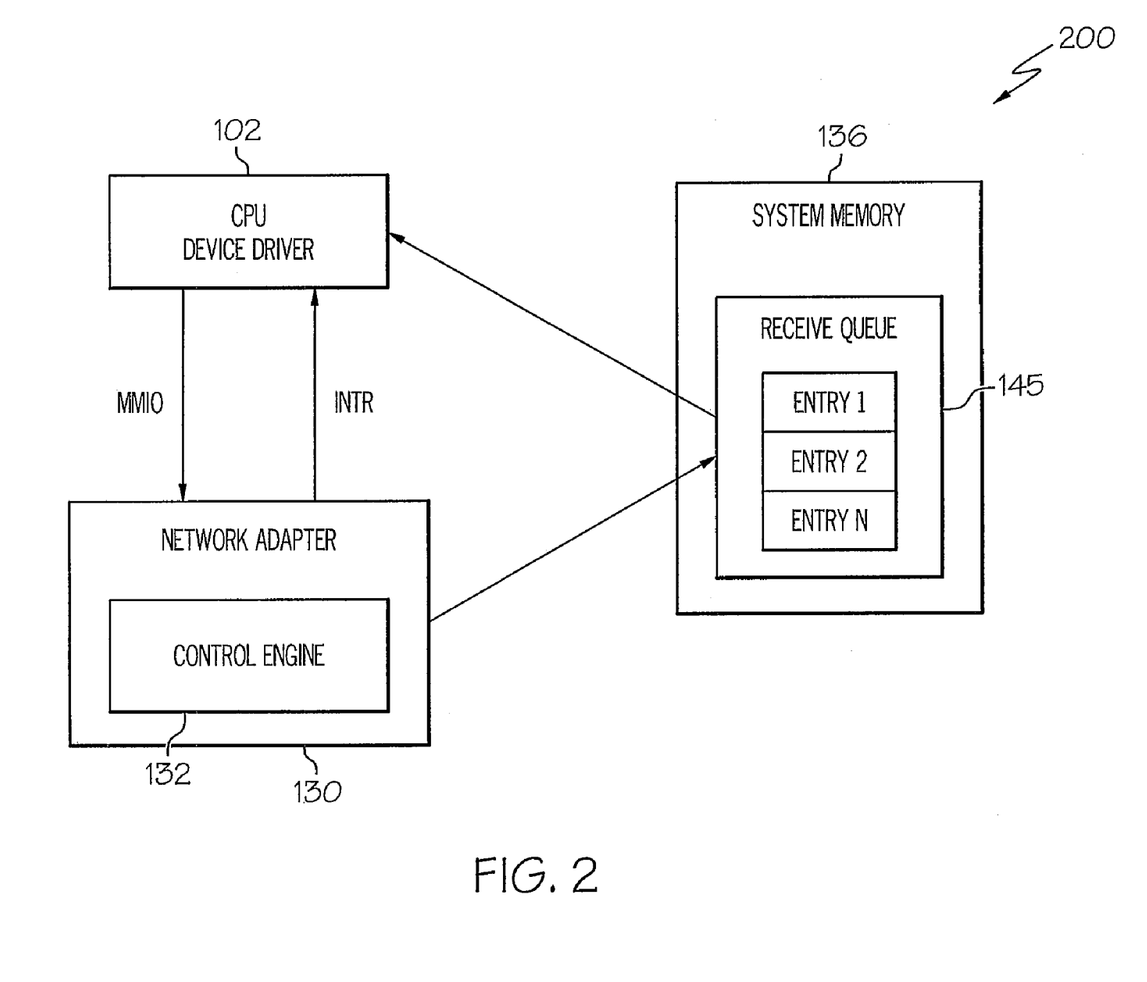
FIG. 2 depicts a high level block diagram of a receive message structure for network interface communication utilized by the present invention.
Figure 3:
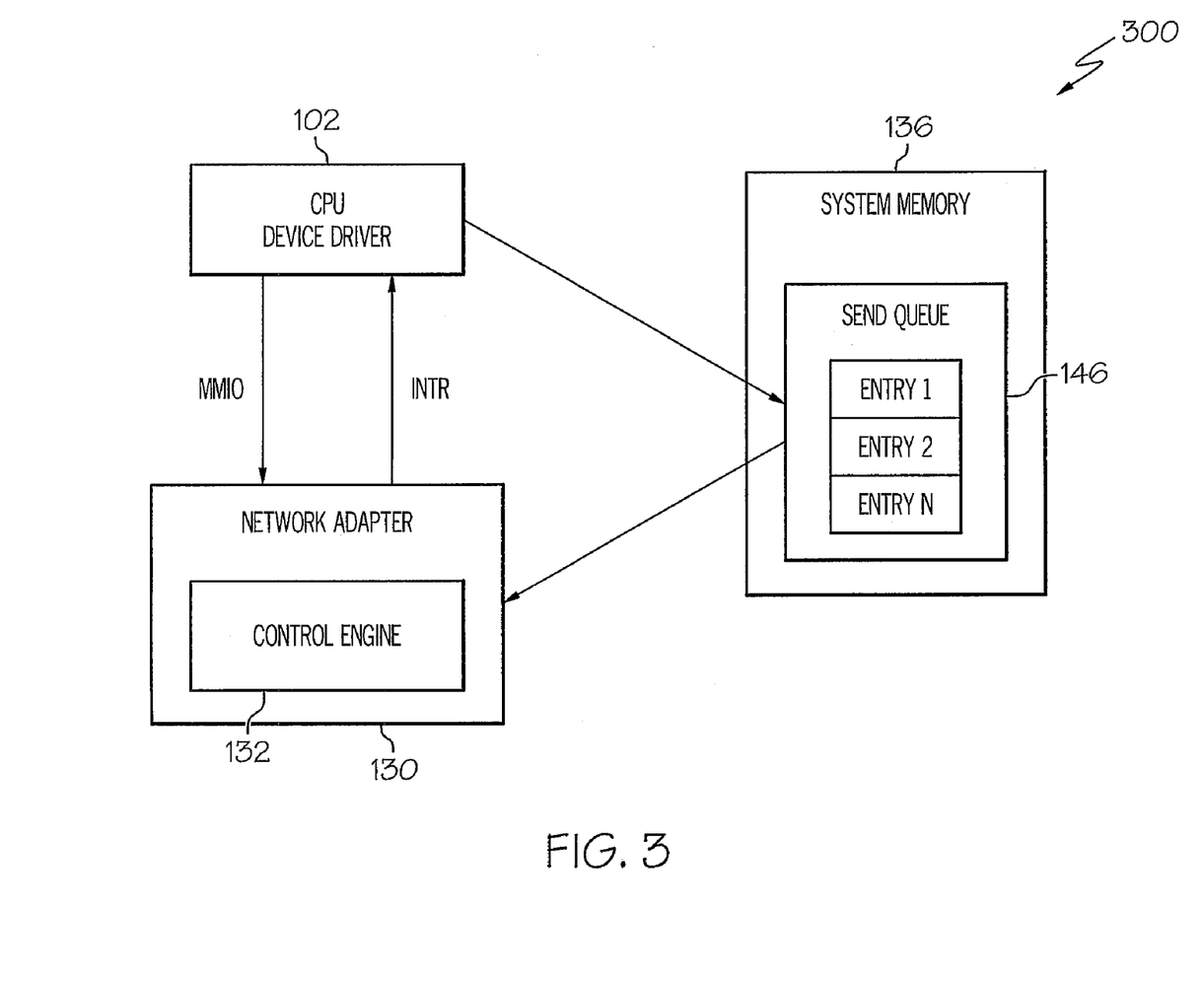
FIG. 3 depicts a high level block diagram of a send message structure for network interface communication utilized by the present invention.

As depicted in FIGS. 2 and 3 a communication memory, which may be configured as a portion of the system memory 136, includes a receive queue 145, a send queue 146 and a process completion queue 147. The system memory 136 (i.e., the communication memory) communicates with the CPU 102 and the network adapter 130 and serves as an intermediate storage location for packet data passing from the network adapter 130 to the CPU 102, and vice versa. In operation, the CPU 102 sends control information, which may be control information for load data or store data, to the network adapter 130 using MMIO operations, which may be 64-bit read or write transactions, which may directly affect the operation of the network adapter 130 and the communication of data between the device driver and the network adapter 130. The CPU 102 may read data, e.g., packet data, from and write data (e.g., packet data) to the system memory 136 using load and store operations. The network adapter 130 may read data from the send queue 146, and write data to the receive queue 145, of the system memory 136 using direct memory access (DMA) operations performed in parallel to the previously described read/write MMIO operations which may occur between the CPU 102 and the network adapter 130. Furthermore, the network adapter 130 may send interrupts to the CPU 102, where an interrupt may include only a small amount of information, such as an identifier specifying which network adapter 130, or communication memory queue (e.g., receive queue 145, send queue 146, or completion queue 147) of the system memory 136 contains data entries and is requesting service.

Referring to FIG. 2, a high level block diagram is depicted of a conventional software receive message structure 200 for network interface communication in computer 100. The network adapter 130, which includes a control engine 133, communicates control information to the CPU 102 by passing the control information (and packet data) to the receive queue 145 for processing by a device driver application running in the CPU 102. The network adapter 130 receives packet data from the network 128 and passes the packet data to the device driver through the receive queue 145 of the communication memory (e.g., system memory 136). The system memory 136 communicates with the CPU 102 and the network adapter 130 and serves as an intermediate storage location for packet data passing from the network adapter 130 to the CPU 102.

In the receive data flow operation, packet data information is passed from the network adapter 130 to the CPU 102 via the device driver application running in the CPU 102. The CPU 102 maintains a head pointer to the receive queue 145 of the system memory 136, and the network adapter 130 maintains a tail pointer to the receive queue 145. The receive queue 145 includes a plurality of data entries in data entry positions depicted as "Entry 1" through "Entry N". The network adapter 130 passes to the receive queue 145 a plurality of data entries, which may include, for example, software packet data descriptors. The data entries of the network adapter 130 are passed to the CPU 102, such that a data entry is written by the network adapter 130 to a tail position (i.e., position Entry 1 or Entry N) of the receive queue 145 using a DMA operation. The network adapter 130 may then notify the CPU 102 that new data entries are available in the receive queue 145 by raising an interrupt which identifies the receive queue 145. The CPU 102 then reads the data entries starting from a head position (i.e., position Entry N or Entry 1) of the receive queue 145. After this, the CPU 102 notifies the network adapter 130 of a completion, that is, that a data entry was read (or that multiple data entries were read), by issuing an MMIO operation to the network adapter 130. This allows the network adapter 130 to monitor free space in the receive queue 145 and to provide the network adapter 130 with information to be used by the network adapter 130 so that it will not overrun the receive queue 145 with data entries.

Referring to FIG. 3, a high level block diagram is depicted of a conventional software transmit, or send, message structure 300 for network interface communication in the computer 100. In the send operation, data packets (packet data) are passed from the device driver of the CPU 102 to network adapter 130. In addition, the CPU 102 maintains a tail pointer to the send queue 146 of the system memory 136, and the network adapter 130 maintains a head pointer to the send queue 146. The send queue 146 includes a plurality of data entries in positions, depicted as "Entry 1" through "Entry N". Data entries associated with the CPU 102 (for example, packet data descriptors) are passed to the network adapter 130, such that a data entry is written to the tail position (i.e., position Entry 1 or Entry N) of the send queue 146. The CPU 102 may then notify the network adapter 130 that new data entries are available in the send queue 146 by, for example, a MMIO operation. The address of the MMIO may indicate the address of the send queue 146. The data of the MMIO operation may indicate how many data entries were sent by the device driver to the send queue 146. The network adapter 130 can then read the data entries from the head position (i.e., position Entry N or Entry 1) of the send queue 146.

Referring again to FIG. 3, a conventional software message completion structure for network interface communication in the computer 100 includes a completion queue 147 that includes a plurality of data entries received from the network adaptor 130, which unlike the data entries of the receive queue 145 or the send queue 146 do not include information which points to packet data, but instead, the completion queue 147 data entries include process completion information such as status information, or identifiers (or other meta data) corresponding to data entries that were processed by the network adaptor 130 from the send queue 145 (or the receive queue 146). The plurality of completion queue 147 data entries are arranged in data entry positions depicted as "Entry 1" through "Entry N". In the send operation, the network adapter 130, which includes the control engine 133, communicates the send completion information, which is process control information and not packet data, to the device driver by passing the send completion information to the device driver of the CPU 102 via the completion queue 147.

When the network adapter 130 has completed processing a data entry (or group of data entries) from the send queue 146, it notifies the CPU 102 of the completion by either placing a completion data entry (process control information) into the completion queue 147 and raising an interrupt to the network adapter 130, or the network adapter 130 may modify a flag in the send queue 146 to indicate that its processing of the data entry (or group of data entries) from the send queue 146 is completed. However, an additional interrupt may be necessary to prompt the CPU 102 to examine the send queue 146 for additional data entries to be processed. Alternatively, the CPU 102 may poll the completion queue 147 to determine when a completion indication occurs. Both the additional interrupt and the polling used by the conventional process create undesired inefficiencies.

Referring to FIGS. 2 and 3, a conventional processing sequence utilized with the network adapter 130 and the device driver running on the CPU 102 for processing the receive queue 145 (or the completion queue 147) is as follows:

1. Using DMA operation, the network adapter 130 sends data entries to the receive queue 145 (or to the completion queue 147).
2. The network adapter 130 signals to the device driver that data is available in the receive queue 145, or to the completion queue 147, via an interrupt. The network adapter 130 disables further interrupts until requested by the device driver.
3. The device driver processes data entries in the receive queue 145 (or the completion queue 147).
4. Using MMIO write operation, the device driver signals to the network adapter 130 that data entries to follow should cause an interrupt. This step may also include sending interrupts with a delay.
5. Using MMIO read operation, the device driver reads back from the network adapter 130 that interrupts have been re-enabled, to ensure that an interrupt enablement command has been received by the network adapter 130.
6. The device driver checks for unprocessed data entries in the receive queue 145 (or the completion queue 147) which may have arrived since completion of step 3, above.
7. The network adapter 130 sends an interrupt associated with the next data entry of the receive queue 145 (or the completion queue 147).

The above steps 5 and 6 are required in the conventional scheme because of the end-of-initiative (completion) problem, as described above, which arises because communication between the CPU 102, the system memory 136 and the network adapter 130 are not instantaneous and not without associated delays. Therefore, it is possible and likely that the device driver may read a last data entry from the receive queue 145 (or the completion queue 147) such that the next entry in the receive queue would not be valid data. The device driver then indicates to the network adapter 130 to re-enable interrupts. However, in the meantime (while the MMIO read operation by the device driver is in progress), the network adapter 130 may write additional data entries to the receive queue 145 (or the completion queue 147). If the device driver were to complete processing at this point, it would not be aware of and would not process the new entries in the receive queue 145 (or the completion queue 147) that had been written by the network adapter 130. If no additional data entries arrive in the receive queue 145 (or the completion queue 147) to generate an interrupt, those data entries would remain in the receive queue 145 (or the completion queue 147) indefinitely without being processed by the device driver.

Figure 4:
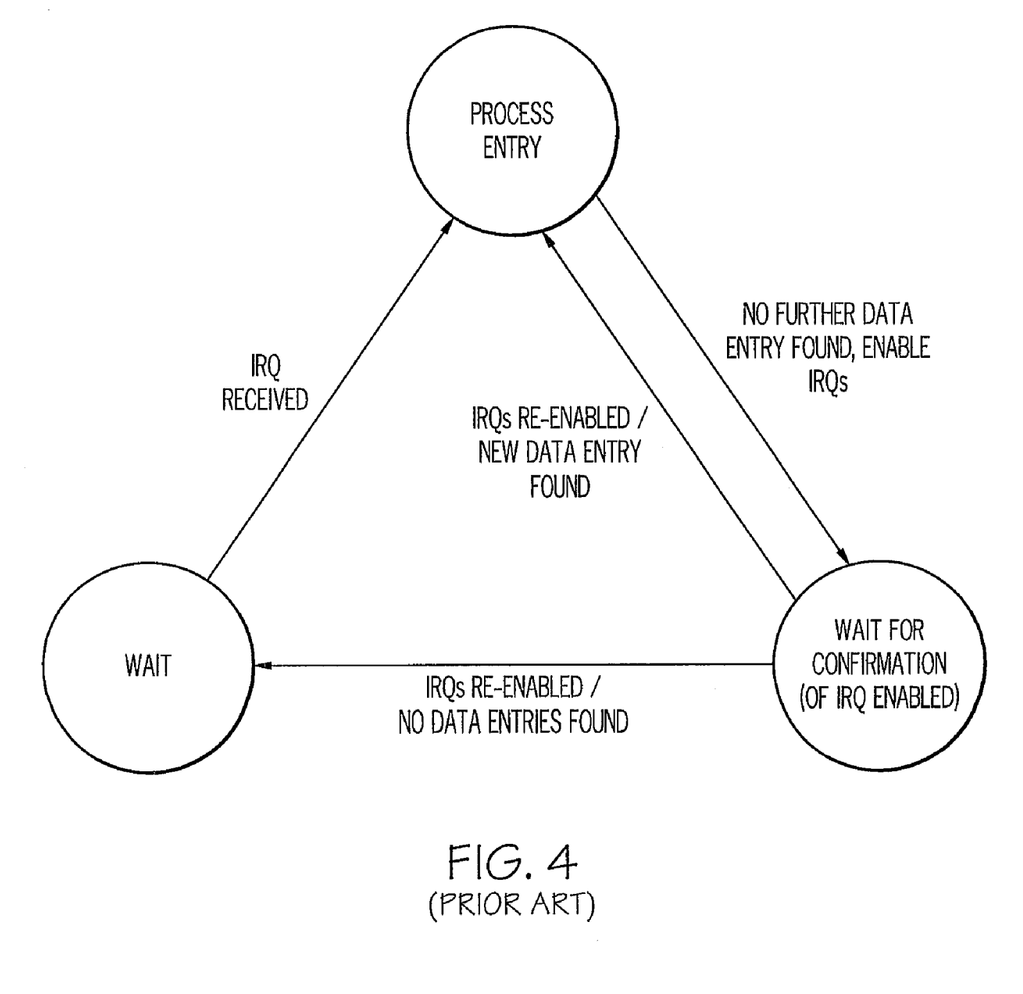
FIG. 4 depicts a state diagram for a conventional device driver.

To prevent the above-described handshaking and data entry loss problem associated with conventional handshaking during send and receive data flow operations between the device driver and the network adapter 130, the device driver must re-examine the receive queue 145 (or the completion queue 147) after interrupts have been enabled (verified). The process of verifying that interrupts have been enabled is an inefficient process, as is illustrated in FIG. 4 below. The verification of interrupt process requires that the CPU 102 wait for a "round trip" MMIO (e.g., an MMIO read) to be sure that the network adapter 130 has processed all data entries associated with the interrupt enable, which is inefficient and causes end-of-initiative processing latency.

Referring to FIG. 4, a state diagram for a conventional message process utilized by the device driver is depicted. The device driver is in one of three states. In the WAIT state, the device driver waits for an interrupt from the network adapter 130. The CPU 102 may perform other tasks during this time. When an interrupt occurs, the CPU 102 switches context to the device driver and the device driver enters a "process entry" state where it processes entries in the receive queue 145 (or the completion queue 147). In a receive data flow example, the device driver processes data entries until there are no more valid data entries in the receive queue 145. The device driver then enters a "wait for confirmation" state where it issues a MMIO operation to the network adapter 130 to re-enable interrupts. The device driver also issues a MMIO read operation to ensure that the interrupts have been re-enabled before moving to the next state. When the MMIO read operation completes, the device driver again determines whether the receive queue 145 (or the completion queue 147) is empty. If the respective queue is not empty, it must return to the process entry state to empty the receive queue 145 (or the completion queue 147). This process repeats until the device driver finds the receive queue 145 (or the completion queue 147) empty after the MMIO read operation. Then, the process returns to the WAIT state. The device driver is then certain that any new data entry in the receive queue 145 (or the completion queue 147) will produce an interrupt.

The conventional schemes described above that are used for completion notification during data receive flow and data send flow operations between the network adapter 130 and the CPU 102 in regard to FIGS. 2, 3A and 4 have inherent inefficiencies. There is significant CPU 102 overhead associated with processing each interrupt from the network adapter 130 to the CPU 102. An efficiency goal is to minimize the number of interrupts. Additionally, polling by the device driver of the receive queue 145 or the send queue 146 for completions is wasteful of CPU cycles if the queue is empty. Furthermore, frequent polling by the device driver is required.

In contrast to the conventional end-of-initiative process described above, the present invention utilizes a novel interrupt processing sequence utilized by the network adaptor 130 and the device driver to solve the end-of-initiative (completion) problem, and eliminates the conventional requirement, for example, as illustrated in FIG. 4, that for a "receive" data flow example, the device driver must check for re-enablement of interrupts and then re-poll the receive queue 145 for additional data entries. The present invention eliminates polling by the device driver after the interrupt, and includes a threshold count value for the MMIO data that is used to re-enable interrupts as described above. The network adapter 130 uses the threshold count value to automatically determine whether a new interrupt needs to be sent to the device driver, such that the threshold count value is understood by both the network adapter 130 and the device driver.

An embodiment of an end-of-initiative (completion) processing sequence of the present invention utilized by the network adapter 130 and the device driver running on the CPU 102 for communication of a receive data flow or a send data flow operates in conjunction with state registers 135, which are implemented as a single register (e.g., a 64-bit Interrupt Control Register (ICR)), or as separate registers, disposed within the network adapter 130 and formatted as follows:

Interrupt Enabled (E) Register—Flag (e.g., 1-bit value) to indicate interrupts are enabled/disabled. This value can be set by the network adapter 130, or by using a MMIO write operation by the device driver to send the value to the network adapter 130. When enabled, interrupts can be raised by the network adapter 130 under conditions as described below.

Entry Threshold (ET) Register—This register is loaded by the device driver using MMIO write operations and indicates a threshold count value ET which corresponds to a threshold value for a count of a data entries to be written by the network adapter 130 to the receive queue 145 or the completion queue 147, such that once a final data entry, that is, the data entry associated with the threshold count value ET of data entries, is written to the receive queue 145 or the completion queue 147 by the network adaptor 130, an interrupt is automatically generated by the network adaptor 130 to the CPU 102 to indicate a completion of a receive or send, respectively, data flow process. The ET register is normally updated by the device driver once per processing cycle of the device driver (i.e. once per interrupt) and is typically advanced by the number of data entries which have been processed by the device driver during the processing (execution) cycle (i.e., X, or X+A, as described below). The threshold count value ET has a maximum value, after which the ET value wraps.

Interrupt Time Delay (T) Register—this register is normally set to zero, and it is written to by the device driver to indicate an additional time delay (T), described below, that may be applied after the Threshold Condition (described below in step #2) is met, but before an interrupt is raised by the network adaptor 130 to the device driver.

Interrupt Processor Number (P) Register—this register indicates a unique indentifying value (P) corresponding to a processor of the computer 100 (which may have a plurality of processors configured similar to CPU 102 where each of the plurality of processors have an associated unique indentifying number) which is to receive an interrupt from the network adaptor 130.

Entry Written (W) Register—this register is maintained by the network adapter 130 and indicates a count value W corresponding to the count of a most recent data entry written to the receive queue 145 or completion queue 147 by the network adapter 130. After a data entry in the respective queue is written there by the network adapter 130, the value of W is incremented by a count of one. The W register has a maximum count value for W, which is equivalent to the maximum count value for ET which is stored in the ET Register. After the maximum count value of W is achieved, the value of W wraps.

In the present invention, if the state registers 135 are implemented in the network adaptor 130 as the ICR, as described above, the E Register, the ET Register, the T Register and the P Register can have a single MMIO address so that the device driver can write a value to each of these registers simultaneously using a single MMIO write operation addressed to the ICR and the values for the individual registers are in a separate field of the data written in the single MMIO write operation.

At initialization time, the ET and W registers are set to a same value, which is a variable count value X, which is maintained by the device driver of the CPU 102. Additionally at initialization, the E Register flag is enabled. The device driver variable count value X represents a count associated with a final data entry that was processed by the device driver of the CPU 102 from the receive queue 145 or the completion queue 147 from a group of data entries.

A sequence for data receive flow or data send completion flow between the network adaptor 130 and the device driver is as follows. After initialization, the sequence continuously loops through the following steps 1-4:

1. The network adapter 130 sends data entries to the receive queue 145 during receive data flow operation, or to the completion queue 147 during send data flow operation, and increments the W Register after each data entry is sent (written) to the respective queue.
2. Threshold Condition—The network adapter 130 compares the current value of the W Register to the value of the threshold count value ET of the ET Register and raises an interrupt to the device driver if the current value of the W Register exceeds the value of ET. The network adapter 130 disables further interrupts to the device driver by disabling the E Register Flag.
3. After receiving the interrupt, the device driver processes data entries stored in the receive queue 145 or the completion queue 147 until all of the data entries stored in the respective receive queue 145 or completion queue 147 have been processed by the device driver, or until the device driver reaches an internal processing limit (which, for example, may be based upon Operating System (OS) 138 rules or limits). The device driver then increments the variable count value X by a count of one for each data entry which is processed by the device driver from the respective receive queue 145 or completion queue 147.
4. Using an MMIO write operation, the device driver provides to the network adapter 130 the current value for the variable count value X (or the value X+A, as described below). Additionally, the device driver enables interrupts by enabling the E Register Flag.

Using the above-described end-of-initiative (completion) sequence of the present invention, the device driver has no need to check to determine (by polling, or otherwise) whether additional data entries have been stored in the receive queue 145 or the completion queue 147 by the network adapter 130. The Threshold Condition, described in step #2 above, eliminates the need for the device driver to check for the additional data entries since the Threshold Condition will automatically trigger an interrupt from the network adapter 130 to the device driver.

Furthermore, in other embodiments and as an enhancement to the above-described embodiment of the completion sequence of the present invention, during step #4 above, the device driver signals additional information to the network adapter 130, in regard to controlling the interrupts, including the following information:

- The additional interrupt information may include a value for a delay count A to be used by the network adapter 130 to delay the sending of the interrupt until X+A data entries have been written to the receive queue 145, or the completion queue 147, by the network adapter 130. That is, the device driver sends to the ET Register of the network adapter 130 a value for X which is equal to X+A;
- The additional interrupt information may include a non-zero value for a time T for the T Register, described above, to be used by the network adapter 130 to delay a next interrupt to the device driver for at least the time T after the additional interrupt information, which includes the value T, is set by the device driver;
- The additional interrupt information may include a value for the P Register, described above. Furthermore, a processor corresponding to the value P may be a virtualized processor core;
- The additional interrupt information may be set asynchronously by the device driver to disable interrupts.

Figure 5:
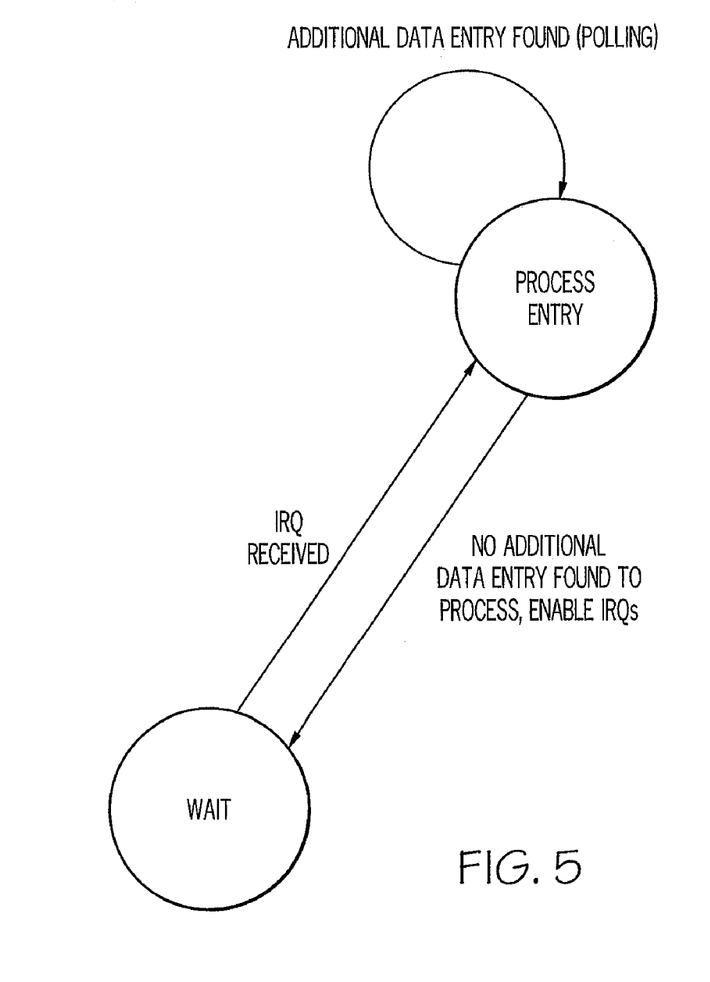
FIG. 5 depicts a state diagram for a device driver, in accordance with an embodiment of the present invention.

Referring to FIG. 5, a state diagram for a device driver according to an embodiment of the present invention is depicted. In contrast to the conventional state diagram of FIG. 4, the device driver of the present invention is always in one of only two states, which makes receive data flow and send data flow communication between the network adapter 130 and the device driver more optimized and efficient. The "wait for confirmation" state of the conventional state diagram (FIG. 4) for the device driver, where the device driver waits for the interrupt enable to be confirmed, is eliminated. In the present invention, as soon as the device driver processes entries from the receive queue 145, or the completion queue 147, it issues a MMIO write operation to the network adapter 130 which passes all interrupt information to the network adapter 130 as described above, and immediately returns to a WAIT state. No MMIO read operation by the device driver is needed in the process of the present invention, which further improves efficiency.

To implement a network adapter 130 according to an embodiment of the present invention, counters (not shown) used by the network adapter 130 and the device driver take a specific form. In particular, they are not real addresses or virtual addresses of head or tail queue pointers. This is because the device driver and the network adapter 130 may use different addressing for the receive queue 145 and/or the completion queue 147, and therefore may not be able to communicate properly using real or virtual addresses. A count for the network adapter 130 and the device driver is simply a count of data entries processed. Furthermore, these counts are synchronized as between network adapter 130 and the device driver at initialization, as described above (for example, counters used by the device driver and the network adapter 130 may be set to zero).

Furthermore, count values for the counters must wrap (i.e., return to zero or to a value less than the maximum value) when a maximum value is achieved. The maximum value is the same for both the network adapter 130 and the device driver. In addition, a "greater than" comparison is determined relative to the current count value and is considered the "midway" point, since the counting space is circular (i.e., it wraps). Also, the counting space must be large enough to avoid having more unprocessed data entries in the receive queue 145 or the completion queue 147 than half of the counting space. Therefore, the counting space must be at least twice the size of the maximum size of the respective queue (i.e., at least twice the greatest number of data entries that can fit in the respective queue).

Figures 6A, 6B:
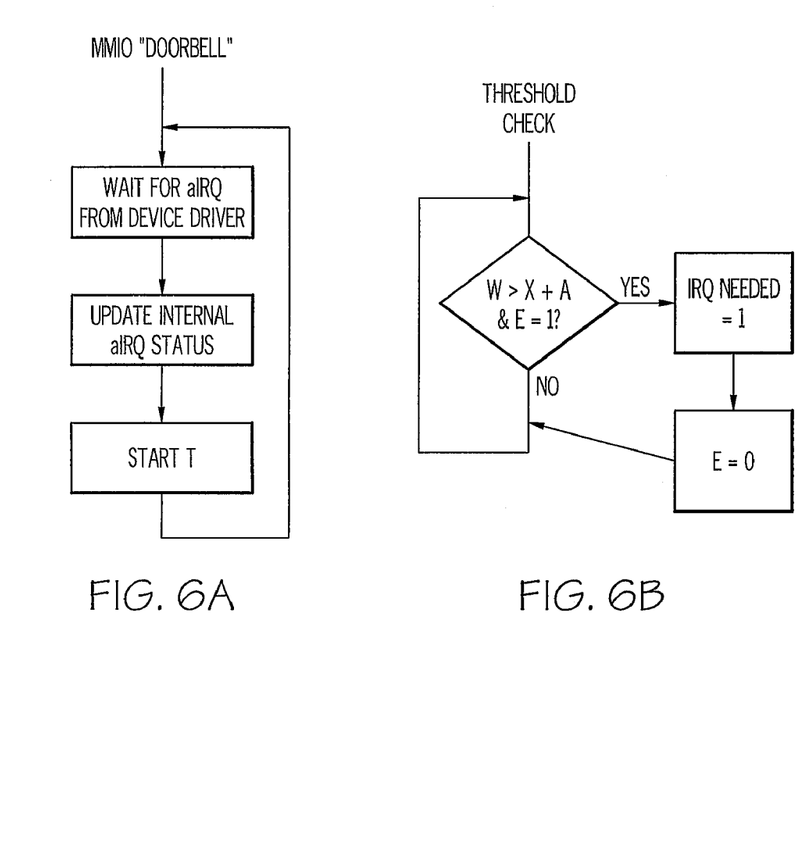
FIGS. 6A-C depict embodiments of a data communication process, in accordance with the present invention.
Figure 6C:
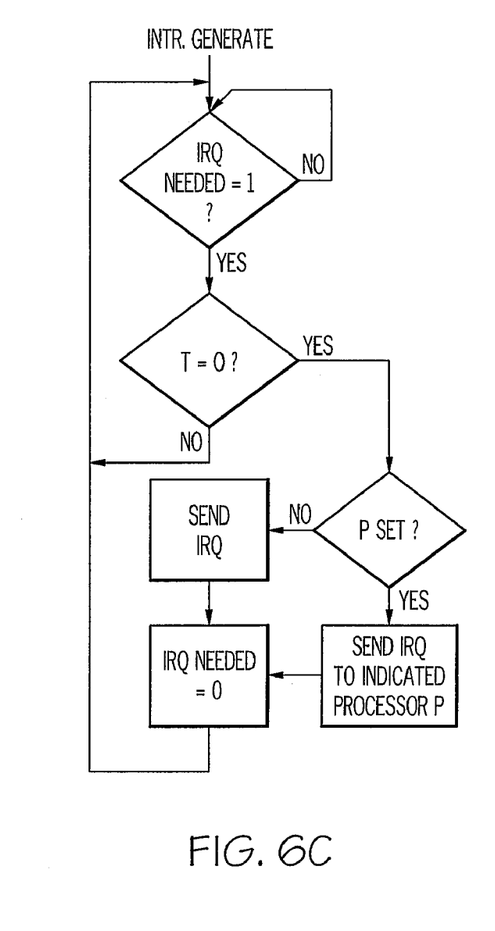

Referring to FIG. 6A-C, a plurality of flow diagrams for a device driver using a data communication process according to embodiments of the present invention is depicted. The flow diagram of FIG. 6A depicts an embodiment of functions of the network adapter 130 when it receives the MMIO write "doorbell" signal from the device driver of the CPU 102 to enable interrupts, as described above. Information received in the MMIO doorbell includes an interrupt enable flag value E, a timer delay value T, a threshold count value ET, a value for a processor P to receive the interrupt, and a value for the delay count A. If the timer delay value T is non-zero, a timer (not shown) is initiated immediately for the receive queue 145 or the completion queue 147.

The flow diagram of FIG. 6B depicts an embodiment of a network adapter 130 processing sequence used to check for the Threshold Condition, as described above, for the receive queue 145 or the completion queue 147. If interrupts are enabled (e.g., E=1), and if the count W of the last data entry written to by the network adapter 130 is greater than the threshold count ET (which may include the variable count value X, or the sum of X+the delay count A), then an interrupt is needed and a flag (i.e., IRQNeeded=1) is set. Also, interrupts are disabled (e.g., E is set=zero).

The flow diagram of FIG. 6C depicts an embodiment of interrupt generation logic. If it has been determined that the threshold count ET has been exceeded (e.g., IRQNeeded=1), and if the interrupt delay time T has expired (or, was initially set to zero), then an interrupt is generated by the network adaptor 130 to the device driver. A value corresponding to a particular processor to which to direct the next interrupt is set by the device driver. The next interrupt is generated to that identified processor. Also, the E Register Flag is disabled, which disables further interrupts.

An embodiment in software of an implementation of the device driver processing scheme of the present invention is now described. Each respective completion and receive queue (147 and 145) is associated with the following MMIO registers (state registers 135) implemented in the network adapter 130:

An Interrupt Control Register (ICR) (64-bit), where each ICR includes:
- An enable bit (E) (1 bit) to enable interrupts,
- Timer delay value (T) (8 bits) used for the counters to count down when ECR of the completion/receive queue (147/145)>variable count X, and
- A Threshold count value ET (24 bits), such that an interrupt is raised when the data entry counter (not shown) of the completion/receive Queue (147/145)>threshold count value ET; and An Entry Counter Register (ECR) (64-bit), where each ECR includes:
- A data entry count W (24 bits) which represents a counted number of data entries placed in the completion/receive queue (147/145) by the network adaptor 130.

As described in the preceding paragraph, an interrupt is generated by the network adaptor 130 to the device driver if:

data entry count W>=threshold count value ET (which is set to be equal to X, or to (X+delay value A)), AND the timer (T)=Zero, AND the interrupt is enabled (e.g., E=1).

Additional embodiments of modes of operation utilized with the present invention in regard to the above-described implementation include:

I. A Polling mode—where interrupts are disabled,
ICR Irq enabled E=0, and
device driver polls the completion/receive queue (147/145).

II. A Threshold mode—such that, on the send side, when the device driver gets a send complete interrupt, it reads the send queue 146 count value W to determine the count of the last send data flow entry processed by network adapter 130 from the send queue 146. The device driver can then free a number of send buffers equal to the count W. On the receive side, the receive queue 145 is polled and the device driver either empties it or it reaches an internal processing limit. No read of the data entry count value W is needed. The device driver performs an MMIO write operation to the ICR to enable interrupts and to provide the variable count value X. If the variable count value X is less than the current data entry count value W, an interrupt is raised immediately. When a data entry is processed which makes the current count value W greater than the variable count value X in the ICR, an interrupt is raised.

III. Timer mode—When the device driver gets a send complete interrupt, indicating that the network adaptor 130 has completed processing data entries from the send queue 146, it reads the send queue 146 count value W to determine the count of the last data entry processed by the network adapter 130 from the send queue 146. The device driver can then free an equal number of send buffers. On the receive side, the device driver polls the receive queue 145 and either empties it, or reaches a limit. No read of the count value W is needed. An MMIO write to the ICR enable timer mode is performed which provides the delay timer value T and gives the ICR the count value W corresponding to a count of a final data entry written by the network adaptor 130 to the receive queue 145. The timer starts running immediately and is decremented at every time T (e.g., T=5 usec) by the network adapter 130. The network adapter 130 raises an interrupt when the timer reaches zero if the data entry count value W is greater than the threshold count value ET in the ICR, and the interrupt enable flag is enabled in the ICR. Interrupts are not raised when the delay timer T is >0. If the ICR threshold count value ET is not exceeded by the count value W by the time the delay timer T expires, then an interrupt is raised when the threshold count value ET is exceeded.

The present invention can also be used in the following alternative embodiments. Instead of using system memory 136 for queue structures, the queues may be retained in cache memory (not shown) which is disposed local to a specific processor of the computer 100. A cache inject mechanism may be used by the network adapter 130 to place queue data entries directly into the cache memory. In another embodiment, instead of using system memory 136 for storing queue structures, the respective queue may be located in memory (not shown) resident on the network adapter 130. Such an embodiment may be desirable if the network adapter 130 has more access to the respective queues than the CPU 102.

It is understood that the use herein of specific names are for example only and not meant to imply any limitations on the invention. The invention may thus be implemented with different nomenclature/terminology and associated functionality utilized to describe the above devices/utility, etc., without limitation. While the present invention has been particularly shown and described with reference to a preferred embodiment, it will be understood by those skilled in the art that various changes in form and detail may be made therein without departing from the spirit and scope of the invention. Furthermore, as utilized in the specification and the appended claims, the term "computer" or "system" or "computer system" or "computing device" includes any data processing system including, but not limited to, personal computers, servers, workstations, network computers, main frame computers, routers, switches, personal digital assistants (PDAs), telephones, and any other system capable of processing, transmitting, receiving, capturing, and/or storing data.

It should be understood that at least some aspects and utilities of the present invention may alternatively be implemented in a computer-storage medium that contains a program product. That is, the present invention can also be embodied as programs defining functions in the present invention as computer-readable codes on a computer-readable medium. The computer-storage medium may be a computer-readable medium, which can include a computer-readable recording medium and/or a computer-readable transmission medium, and/or a computer-readable/writeable recording medium. The computer-readable recording medium is any data storage device that can store data which can be thereafter read by a computer system. Examples of a computer-readable recording medium include read-only memory (ROM), and examples of a computer-readable/writeable recording medium include random-access memory (RAM), CD-ROMs, magnetic tapes, floppy disks, hard disk drives, memory stick devices, and optical data storage devices. The computer-readable recording medium can also be distributed over network coupled computer systems so that the computer-readable code is stored and executed in a distributed fashion. The computer-readable transmission medium can transmit data via a wired or wireless configuration (e.g., wired or wireless data transmission through the Internet). Also, functional programs, codes, and code segments to accomplish the present invention can be easily construed by programmers skilled in the art to which the present invention pertains. Further, it is understood that the present invention may be implemented as a system having means in the form of hardware, software, or a combination of software and hardware as described herein, or their equivalent.

What is claimed is:

1. An end-of-initiative method for data communication between a device driver running on a processor in a computer system, and a network adaptor, the method comprising:
    initializing (1) a data entry threshold count value ET which is maintained in the network adapter and represents a threshold count for a plurality of data entries to be written by the network adapter to the device driver, (2) a data entry written value W which is maintained in the network adaptor and represents a current count of the plurality of data entries which have been written by the network adapter to the device driver, and (3) a variable count value X which is maintained by the device driver and represents a count associated with the plurality of data entries processed by the device driver;
    processing data entries by the device driver from a communication memory which is communicatively coupled to the network adaptor and the device driver, such that the variable count value X is incremented by a count of one for each data entry of the plurality of data entries which is processed by the device driver from the communication memory, until a final data entry of the plurality of data entries is processed from the communication memory, such that the variable count value X has advanced to a count associated with the final data entry, and such that the processing of additional data entries from the communication memory by the device driver pauses;
    in response to the pausing of the processing of additional data entries from the communication memory by the device driver, providing the network adaptor with interrupt information from the device driver to be used by the network adapter to control the interrupt generated by the network adaptor to the device driver, such that the interrupt information includes a current value of X, and the value of ET is set equal to the current value of X, wherein the interrupt information is provided by the device driver to the network adaptor via a single memory-mapped input/output (MMIO) write to an address of a single register disposed in the network adaptor which has stored therein the data entry threshold count value ET and the data entry written value W;

writing data entries of the plurality of data entries, by the network adaptor, to the communication memory, such that the data entry written value W is incremented by a count of one for each data entry of the plurality of data entries which is written to the communication memory by the network adaptor;

comparing the value of ET with the value of W to determine whether a threshold condition exists;

automatically generating an interrupt by the network adaptor to the device driver, in response to a determination that the threshold condition exists, to signal the device driver that the plurality of data entries written by the network adaptor to the communication memory are available in the communication memory to be processed by the device driver;

disabling further interrupts by the network adaptor to the device driver until the device driver requests additional data entries to be processed by the device driver; and in response to the interrupt being generated by the network adaptor, unpausing the processing of additional data entries from the communication memory by the device driver, such that the variable count value X is incremented by a count of one for each data entry of the plurality of data entries which is processed by the device driver from the communication memory.

2. The end-of-initiative method of claim 1, wherein the interrupt information includes a value for a time delay T to control a timing of the interrupt generated by the network adaptor.

3. The end-of-initiative method of claim 1, wherein the interrupt information includes a value for a delay count A to delay the interrupt generated by the network adaptor by X+A, such that the data entry threshold count value ET is set equal to X+A.

4. The end-of-initiative method of claim 1, wherein the communication memory is configured to include a receive queue, and the network adaptor writes the plurality of data entries to the receive queue.

5. The end-of-initiative method of claim 1, wherein the communication memory is configured to include a completion queue and a send queue, such that the network adaptor writes a plurality of data entries to the completion queue to signify to the device driver a completion of processing by the network adaptor of a plurality of data entries from the send queue which have been written to the send queue by the device driver.

6. A data communication system, comprising: a network adaptor; a device driver running in a processor of the data communication system; a communication memory communicatively coupled to the network adaptor and the device driver; and an end-of initiative logic within the network adapter and the device driver that performs an end-of-initiative process for communication of packet data and control information between the network adaptor and the device driver, via the communication memory, wherein said logic comprises logic that:

initializes (1) a data entry threshold count value ET which is maintained in the network adapter and represents a threshold count for a plurality of data entries to be written by the network adapter to the device driver, (2) a data entry written value W which is maintained in the network adaptor and represents a current count of the plurality of data entries which have been written by the network adapter to the device driver, and (3) a variable count value X which is maintained by the device driver and represents a count associated with the plurality of data entries processed by the device driver, processes data entries by the device driver from a communication memory which is communicatively coupled to the network adaptor and the device driver, such that the variable count value X is incremented by a count of one for each data entry of the plurality of data entries which is processed by the device driver from the communication memory, until a final data entry of the plurality of data entries is processed from the communication memory, such that the variable count value X has advanced to a count associated with the final data entry, and such that the processing of additional data entries from the communication memory by the device driver pauses;

in response to the pausing of the processing of additional data entries from the communication memory by the device driver, provides the network adaptor with interrupt information from the device driver to be used by the network adapter to control the interrupt generated by the network adaptor to the device driver, such that the interrupt information includes a current value of X, and the value of ET is set equal to the current value of X, wherein the interrupt information is provided by the device driver to the network adaptor via a single memory-mapped input/output (MMIO) write to an address of a single register disposed in the network adaptor which has stored therein the data entry threshold count value ET and the data entry written value W;

causes the network adapter to write data entries of the plurality of data entries to the communication memory, such that the data entry written value W is incremented by a count of one for each data entry of the plurality of data entries which is written to the communication memory by the network adaptor;

compares the value of ET with the value of W to determine whether a threshold condition exists;

enables the network adapter to automatically generate an interrupt by the network adaptor to the device driver, in response to a determination that the threshold condition exists, to signal the device driver that the plurality of data entries written by the network adaptor to the communication memory are available in the communication memory to be processed by the device driver; and disables further interrupts by the network adaptor to the device driver until the device driver requests additional data entries to be processed by the device driver; and in response to the interrupt being generated by the network adaptor, unpausing the processing of additional data entries from the communication memory by the device driver, such that the variable count value X is incremented by a count of one for each data entry of the plurality of data entries which is processed by the device driver from the communication memory.

7. The system of claim 6, wherein the interrupt information includes a value for a time delay T to control a timing of the interrupt generated by the network adaptor.

8. The system of claim 6, wherein the interrupt information includes a value for a delay count A to delay the interrupt generated by the network adaptor by X+A, such that the data entry threshold count value ET is set equal to X+A.

9. The system of claim 6, wherein the communication memory is configured to include a receive queue, and the network adaptor writes the plurality of data entries to the receive queue.

10. The system of claim 6, wherein the communication memory is configured to include a completion queue and a send queue, such that the network adaptor writes a plurality of data entries to the completion queue to signify to the device driver a completion of processing by the network adaptor of a plurality of data entries from the send queue which have been written to the send queue by the device driver.

11. A computer program product stored on a non-transitory computer-storage medium which includes computer readable instructions that when executed on a computer perform an end-of-initiative process which comprises:

initializing a data entry threshold count value ET which is maintained in the network adapter and represents a threshold count for a plurality of data entries to be written by the network adapter to the device driver, a data entry written value W which is maintained in the network adaptor and represents a current count of the plurality of data entries which have been written by the network adapter to the device driver, and a variable count value X which is maintained by the device driver and represents a count associated with the plurality of data entries processed by the device driver, such that the values of ET, W and X are a same value;

processing data entries by the device driver from a communication memory which is communicatively coupled to the network adaptor and the device driver, such that the variable count value X is incremented by a count of one for each data entry of the plurality of data entries which is processed by the device driver from the communication memory, until a final data entry of the plurality of data entries is processed from the communication memory, such that the variable count value X has advanced to a count associated with the final data entry, and such that the processing of additional data entries from the communication memory by the device driver pauses;

in response to the pausing of the processing of additional data entries from the communication memory by the device driver, providing the network adaptor with interrupt information from the device driver to be used by the network adapter to control the interrupt generated by the network adaptor to the device driver, such that the interrupt information includes a current value of X, and the value of ET is set equal to the current value of X, wherein the interrupt information is provided by the device driver to the network adaptor via a single memory-mapped input/output (MMIO) write to an address of a single register disposed in the network adaptor which has stored therein the data entry threshold count value ET and the data entry written value W;

writing data entries of the plurality of data entries, by the network adaptor, to the communication memory, such that the data entry written value W is incremented by a count of one for each data entry of the plurality of data entries which is written to the communication memory by the network adaptor; comparing the value of ET with the value of W to determine whether a threshold condition exists;

automatically generating an interrupt by the network adaptor to the device driver, in response to a determination that the threshold condition exists, to signal the device driver that the plurality of data entries written by the network adaptor to the communication memory are available in the communication memory to be processed by the device driver;

disabling further interrupts by the network adaptor to the device driver until the device driver requests additional data entries to be processed by the device driver; and in response to the interrupt being generated by the network adaptor, unpausing the processing of additional data entries from the communication memory by the device driver, such that the variable count value X is incremented by a count of one for each data entry of the plurality of data entries which is processed by the device driver from the communication memory.

12. The computer program product of claim 11, wherein the interrupt information includes a value for a time delay T to control a timing of the interrupt generated by the network adaptor.

13. The computer program product of claim 11, wherein the interrupt information includes a value for a delay count A to delay the interrupt generated by the network adaptor by X+A, such that the data entry threshold count value ET is set equal to X+A.

14. The computer program product of claim 11, wherein the communication memory is configured to include a data receive queue, and the network adaptor writes the plurality of data entries to the receive queue.

15. The computer program product of claim 11, wherein the communication memory is configured to include a completion queue and a send queue, such that the network adaptor writes a plurality of data entries to the completion queue to signify to the device driver a completion of processing by the network adaptor of a plurality of data entries from the send queue which have been written to the send queue by the device driver.

* * * * *